J. A. DAVIS.
UPHOLSTERY SPRING ATTACHING DEVICE.
APPLICATION FILED JULY 10, 1911.
1,039,908.
Patented Oct. 1, 1912.
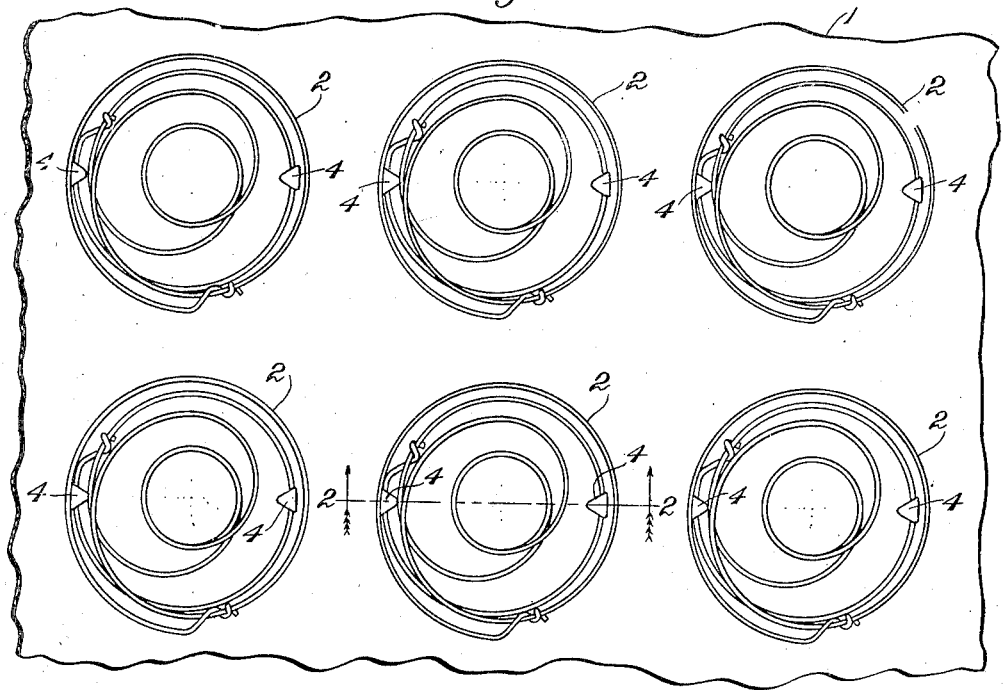
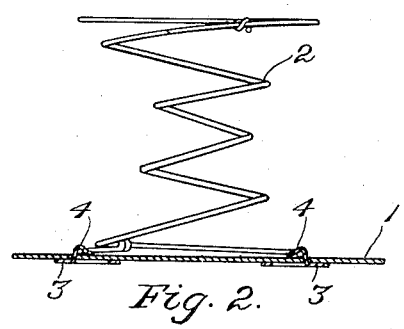
Fig. 2.
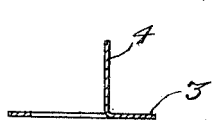
Fig. 4.
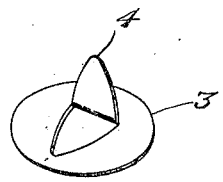
Fig. 3.
Witnesses:
Edith A. Wiseman
Oscar F. Hill
Inventor.
James H. Davis
by Chas. F. Randall
Attorney.

UNITED STATES PATENT OFFICE.

JAMES A. DAVIS, OF AMESBURY, MASSACHUSETTS, ASSIGNOR, BY MESNE ASSIGNMENTS, TO THE CHARLES WING COMPANY, OF AMESBURY, MASSACHUSETTS, A CORPORATION OF MASSACHUSETTS.

UPHOLSTERY-SPRING-ATTACHING DEVICE.

1,039,908.  Specification of Letters Patent.  Patented Oct. 1, 1912.

Application filed July 10, 1911. Serial No. 637,602.

*To all whom it may concern:*

Be it known that I, JAMES A. DAVIS, a citizen of the United States, residing at Amesbury, in the county of Essex, State of Massachusetts, have invented a certain new and useful Improvement in Upholstery-Spring-Attaching Devices, of which the following is a specification, reference being had therein to the accompanying drawings.

The invention provides for attaching the springs which are employed in the upholstery of automobiles, etc., to the backings on which such springs are assembled preliminary to being embodied in such upholstery.

As more particularly contemplated by me, the invention is utilized in attaching a series of double cone springs to a flexible sheet, composed of paste-board, straw-board, or the like, which is bent into the required shape and attached within the framing of the back and sides of an automobile seat.

The invention is not limited to use in connection with automobiles, for it is applicable in the case of other vehicles, and also in connection with furniture.

The invention consists, essentially, in the combination with a supporting sheet for carrying wire springs such as aforesaid, of a plurality of attaching devices formed of sheet metal, each having a broad flat base, and a pointed tongue struck up from the said base, said tongue being passed through the flexible support (of paper material or the like) from the reverse side of the latter and bent around the base-portion of the wire of the spring. The said attaching devices are disposed opposite each other, or otherwise, to effect the secure attachment of each spring.

In the drawings,—Figure 1 shows a portion of a flexible spring supporting sheet, a plurality of springs applied thereto, and attaching devices embodying the invention. Fig. 2 is a partly sectional view of a portion of the said sheet, one of the said springs, and attaching devices such as aforesaid in connection with the said sheet and spring. Fig. 3 is a perspective view of one of the attaching devices of Figs. 1 and 2, shown separately. Fig. 4 is a view of the said attaching device in cross-section.

Having reference to the drawings, the supporting sheet is designated 1, and the coiled wire springs applied thereto are marked 2, 2, etc.

In the form shown in the drawings the attaching device is made of a circular disk, 3, constituting the base thereof, having a substantially V-shaped tongue, 4, struck up from the central portion thereof, although the shape of the piece of sheet metal, and the form of its tongue, may be varied, and in some cases two or more tongues may be formed. The tongue being broad and flat, it holds the base-portion of the wire of the spring 2 firmly and steadily in place, operating to prevent movement or play of the spring upon the flexible backing sheet 1.

The device constitutes a secure, strong attachment which is free from the drawbacks and disadvantages of the cord or string which heretofore has been employed for attaching springs to the backings in the like connections. The bending and other strains to which springs in use are subjected operate to occasion movement of the springs which, in the case of the attaching cords heretofore employed, soon loosens, frays, and cuts or breaks the said cords, so that the springs become loose from their attachment, or are held with less efficiency.

My invention enables the work of attaching a series of springs to the flexible backing or carrier therefor to be effected in an exceedingly small fraction of the time which ordinarily has been required for stitching the springs to the said carriers by cord or twine. The latter method of attachment ordinarily requires about forty minutes for the attachment of eighteen springs, the work being performed by hand. I employ in practice a board or other holder having shallow sockets in which I place the base-portions of a series of attaching devices, with the points of the tongues extending upward. The sockets in the said board are disposed in proper positions with relation to the location of the springs and the contemplated location of the attaching devices in connection with each spring. A sheet of paper-material then is pressed by hand or otherwise down upon the series of projecting points, which pierce the sheet and extend above its upper surface. Then the springs are placed in position, and the points of the attaching devices are bent over by a hammer or other device upon the base-portions of the wires of the springs. As will be obvious, the character of the device renders the use of automatic mechanism for bending or clenching the points entirely feasible.

Preferably, the attaching device has a flat base-portion of considerable size so as to back up and reinforce the sheet of paper-material. Consequently, the said device is prevented from tearing through the paper sheet as it might if only a narrow strip were employed. A valuable characteristic of the attaching device is this broad base-portion extending in both directions outside of the tongue so as to provide for the reinforcement of the sheet of paper-material.

I claim as my invention:—

The combination with a supporting sheet, and a coiled-wire spring, of a plurality of attaching devices formed of sheet-metal having a broad flat base and a pointed tongue struck up therefrom, said tongue passed through the said sheet from the reverse side of the latter and bent around the base-portion of the wire of the spring, the tongues of the respective attaching devices engaging with a coil of the said spring at two or more points and attaching the spring securely to said supporting sheet.

In testimony whereof I affix my signature in presence of two witnesses.

JAMES A. DAVIS.

Witnesses:
CHAS. F. RANDALL,
NATHAN B. DAY.